United States Patent [19]

Kubert

[11] Patent Number: 5,490,317
[45] Date of Patent: Feb. 13, 1996

[54] TAPERED ALIGNMENT GUIDE ARRANGEMENT FOR SELF ALIGNING PART EXCISION DIE MEMBERS IN TAPE AUTOMATED BONDING APPARATUS

[75] Inventor: Vincent T. Kubert, Melbourne, Fla.

[73] Assignee: Microtek Industries, Inc., Palm Bay, Fla.

[21] Appl. No.: 260,756

[22] Filed: Jun. 16, 1994

[51] Int. Cl.$^6$ .............................. B23Q 5/54; B23P 23/04
[52] U.S. Cl. .......................... 29/564.7; 29/556.3; 72/330; 83/637
[58] Field of Search ................................ 29/564.6, 564.7, 29/566.3, 33 K; 140/105; 83/637; 100/918, 214; 72/456, 324, 330; 384/30, 49

[56] References Cited

U.S. PATENT DOCUMENTS

| | | | |
|---|---|---|---|
| 2,422,775 | 6/1947 | Conner | 384/30 |
| 2,846,278 | 8/1958 | Blazek | 384/30 |
| 3,469,894 | 9/1969 | Stamm | 384/30 |
| 3,926,083 | 12/1975 | Vaniszewski | 83/637 |
| 4,064,917 | 12/1977 | Diaz | 72/330 X |
| 5,284,390 | 2/1994 | Hanaway | 384/49 |
| 5,287,608 | 2/1994 | Ellis | 29/33 K |

FOREIGN PATENT DOCUMENTS

| | | | |
|---|---|---|---|
| 662074 | 4/1963 | Canada | 83/637 |
| 1722662 | 3/1992 | U.S.S.R. | 72/456 |

*Primary Examiner*—William Briggs
*Attorney, Agent, or Firm*—Charles Wands

[57] ABSTRACT

The lower ends of alignment bearing shafts of an upper die member of a tape automated bonding apparatus are modified to include tapered alignment pins, each having a tapered surface that is complementary to the tapered interior end of the bore of a respective bushing on a lower die member. The alignment pin serves to guide its associated alignment shaft and a ball bearing sleeve carried thereby into the bushing. In addition, a first set of rails is installed directly beneath a die member actuator, and a second set of rails is installed on the upper die member. The second set of rails slide upon the first set of rails, so that the upper die member effectively mechanically floats on the first set of rails. The lower die member is affixed to a translatable platen, which is driven to an end stop position at the part excision station. Then, the upper die member is lowered onto the lower die member, so that the alignment pins contact the bores in the bushings on the lower die member. Any axial misalignment of the alignment shafts and the bushings is removed as the tapered surfaces of the alignment pins discs are translated by a horizontal force imparted by the bushings. As a result, the upper die member is horizontally aligned with the lower die member, so that the ball bearing cages automatically enter into the bores of the bushings on the lower die member.

7 Claims, 3 Drawing Sheets

TAPERED ALIGNMENT GUIDE ARRANGEMENT FOR SELF ALIGNING PART EXCISION DIE MEMBERS IN TAPE AUTOMATED BONDING APPARATUS

FIELD OF THE INVENTION

The present invention relates in general to the manufacture and assembly of electronic circuit components and circuit boards upon which such components are mounted, and is more particularly directed to a new and improved die alignment bearing shaft arrangement, that enables respective upper and lower part excision die members for a tape automated bonding apparatus to be automatically aligned with one another, when the die members are brought into mutual engagement to excise a part from a part carrier and to shape the leads of the excised part.

BACKGROUND OF THE INVENTION

Tape automated bonding (TAB) apparatus are commonly employed in conjunction with a pick and place device for populating an electronic circuit board with the components of one or more signal processing systems. A non-limiting example of such a TAB apparatus is described in the Ellis, U.S. Pat. No. 5,287,608, issued Feb. 27, 1994, assigned to the assignee of the present application and the disclosure of which is incorporated herein. As diagrammatically illustrated in FIG. 1, which essentially corresponds to FIG. 1 of the above-identified '608 patent, such an apparatus typically includes a part-excision, lead-forming station 12, to which an electronic circuit component that is to be excised from an associated part carrier 13, supplied by way of a carrier storage and supply magazine 11, is transported from a magazine/feed station 14 by means of a carrier shuttle (not shown), which is transported along a track 15. In order to excise the component from its carrier 13 and form the leads of the part for placement onto a circuit board, a pair of die members, comprised of a lower die member or anvil 21 and an upper die member 23, are arranged to be positioned at station 12.

To facilitate cycling between part excision, lead formation and seizure of the excised and formed part for placement on the circuit board, the lower die member/anvil 21 is mounted on a translatable platen 25, which is controllably cycled between the part-excision, lead-forming station 12 to which the part is delivered by the carrier shuttle, and a formed part pick-up station 17, where the excised and formed part is seized by the pick and place device for attachment to the circuit board. The upper die member 23 is positioned at the part-excision, lead-forming station 12, such that it will be aligned with the lower die member/anvil 21, when the lower die member/anvil 21 is returned from the formed part pick-up station 17 to station 12. With the two die members mutually aligned at station 12, a part that has been transported to station 12 is excised from its carrier and placed upon the anvil 21, so that its leads may be shaped in response to the operation of a die member actuator or press 30, which vertically translates the upper die member 23 downwardly into engagement with the part and the anvil 21. In order for the upper and lower die members to be brought into proper engagement with one another at station 12, it is necessary that they be maintained in precise alignment during vertical downward translation of the upper die member 23 onto the anvil 21.

For this purpose, as diagrammatically illustrated in FIG. 2, it is customary practice to mount a plurality of alignment bearing shafts 31 on the lower surface 33 of the upper die member 23, and a plurality of bushings 41 on the upper surface 43 of the lower die member/anvil 21. As shown in greater detail in FIG. 3, each alignment bearing shaft 31 has a ball bearing-containing sleeve or cage 35, having ball bearings 37 that are rotatably translatable along shaft 31. To prevent ball bearing-containing sleeve 35 from coming off the lower end 32 of shaft 31, a retaining element, in the form of a C-clamp 34 is captured within an annular groove 36 adjacent to the lower end 32 of the shaft 31.

Ball bearing-retaining sleeve 35 is sized to be insertable into the bore 40 of a respective bushing 41 on the lower die member 21, so that, when the upper and lower die members are brought together, sleeve 35 will enter the bushing 41 and thereafter guide the shaft 31 vertically downward into the bushing. As a consequence, during its vertical travel, the upper die member 23 will be maintained parallel to the lower die member/anvil 21, thus ensuring proper engagement of the die members with the part.

Because of the very close tolerances of the dimensions of the ball bearings 37, shaft 31 and the interior bore of the bushings 41, in order to realize successful downward travel engagement of the upper die member 23 with the lower die member 21 (provided by insertion of the shafts 31 into bushings 41), it is necessary that the axes of the bearing shafts 31 extending from the bottom surface of the upper die member 23 be very precisely aligned (effectively coaxial) with the axes of the bushings of the lower die member 21. Such alignment has been conventionally carried out by hand, with a TAB machine operator performing a 'look and feel' handling of the die members until the alignment shafts of the upper die are inserted into and fully seated in the bushings of the lower die. In the course of this exercise it has been observed that very slight angular offsets of the alignment shaft and bushing axes will cause the lower edges of the ball bearing-retaining sleeves to become caught or bind in the bores of the bushings, and thereby prevent the sleeves from being readily inserted into the bushings. As a result, very delicate handling of the two die members is required.

Once the upper and lower die members have been aligned with one another, it is further necessary to accurately position the die members relative to the die actuator at the part-excision, lead-forming station. It is not until this two-fold die member assembly and positioning task is performed that the apparatus is ready to excise and form parts. Thus, machine set-up is labor intensive and time consuming. In addition, whenever a die changeover is carried out, this procedure must be repeated for the replacement die members.

SUMMARY OF THE INVENTION

In accordance with the present invention, the above described drawbacks of hand alignment and installation of die members of a TAB apparatus are effectively obviated by a new and improved die member alignment shaft arrangement, that is configured to automatically align the upper and lower part-excision/lead-forming die members at the time of installation, so that both initial installation and changeover of the die may be rapidly accomplished.

To this end, the present invention augments each of the alignment bearing shafts of the upper die member by the addition of respective alignment element which is attached to a lower terminal end of each shaft. The alignment element is preferably configured as a pin or disc having a tapered lower surface that is generally complementary to the tapered interior surface of the entry end of the bore of a respective bushing. The alignment element also has a diameter proximate to that defined by surfaces of the ball bearings contained along the outer surface of the bearing-containing sleeve, so that the tapered alignment element readily guides its associated alignment bearing shaft and ball bearing cage into a bushing on the lower die member. Because the diameter of the tapered insertion guide disc is wider than the interior bore of the ball-bearing cage, it also serves as a cage stop at the terminal end of the alignment shaft.

In addition to modifying the terminal end portion of each alignment shaft, the present invention also involves the installation of a first set of rails at the part excising station directly beneath the die member actuator, and a second set of rails on the upper die member. The second set of rails are sized to slide upon the first set of rails, so as to allow the upper die member to be rapidly inserted at the part excising station and coarsely located upon the first set of rails, whereby the upper die member effectively mechanically floats on the first set of rails. The lower die member is placed upon and fixedly attached to a translatable platen, which is driven to an end stop position at the part excision station. With the platen abutting against the end stop, the 'floating' upper die member is engaged by the die member actuator and translated downwardly toward the lower die member.

As the upper die member approaches the lower die member, the tapered alignment pins at the lower terminal ends of the alignment bearing shafts contact the ends of the bores in the bushings on the lower die member. To the extent there is any initial axial misalignment of the alignment shafts and the bushings, when the tapered surfaces of the alignment pins contact the tapered interior end walls of the bushings, the bushings on the lower die member impart a horizontal translational force against the alignment pins and thus the alignment shafts on the 'floating' upper die member. As a consequence, the upper die member itself is horizontally translated to bring it into alignment with the lower die member, so that the alignment shafts on the upper die member become effectively coaxial with the bushings on the lower die member, allowing the ball bearing cages on the alignment shafts of the upper die member to readily enter into the bores of the bushings on the lower die member.

DETAILED DESCRIPTION

As pointed out briefly above, in accordance with a first aspect of the present invention, the lower terminal ends of the alignment bearing shafts of the upper die member of a TAB apparatus are modified to facilitate entry of each alignment shaft into the bore of its associated respective bushing on the lower die member.

Figure 1:
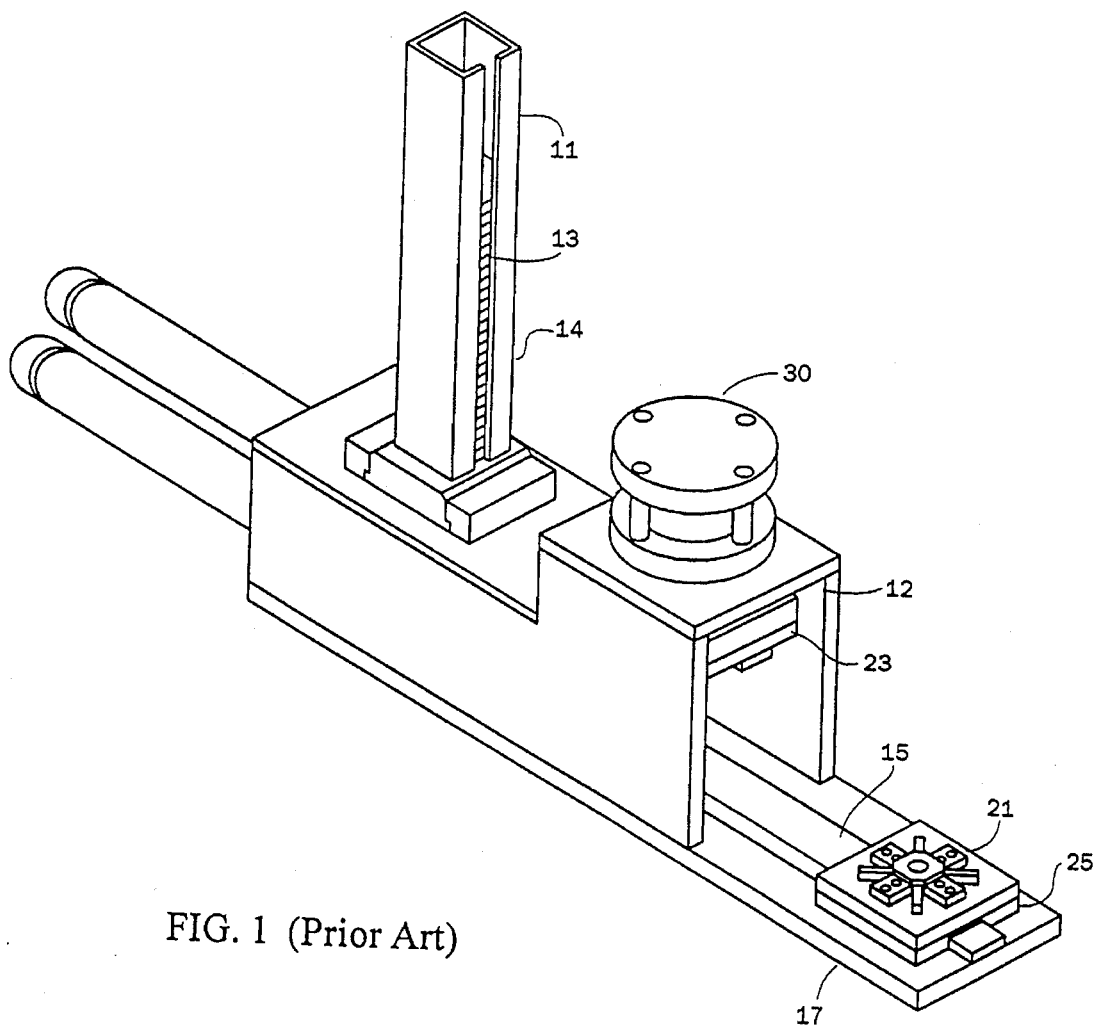
FIG. 1 diagrammatically illustrates a tape automated bonding (TAB) apparatus of the type shown in FIG. 1 of the U.S. Pat. No. 5,287,608, having a part-forming a part-excision, lead-forming station, to which an electronic circuit component is transported from a feed station by means of a carrier shuttle.
Figure 2:
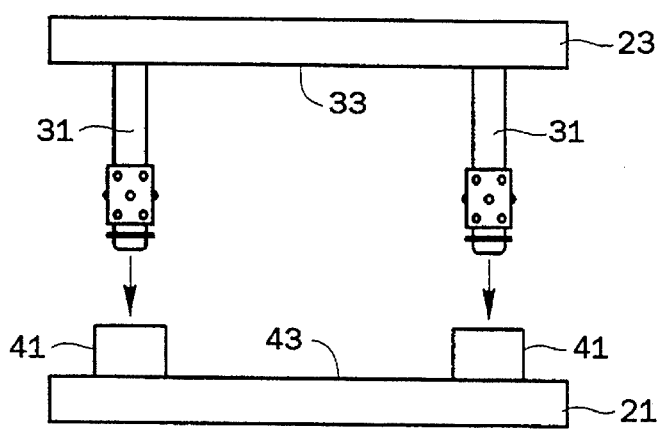
FIG. 2 diagrammatically illustrates a plurality of ball-bearing cage supporting alignment bearing shafts mounted on the lower surface of an upper die member, and a plurality of bushings mounted on the upper surface of a lower die member.
Figure 3:
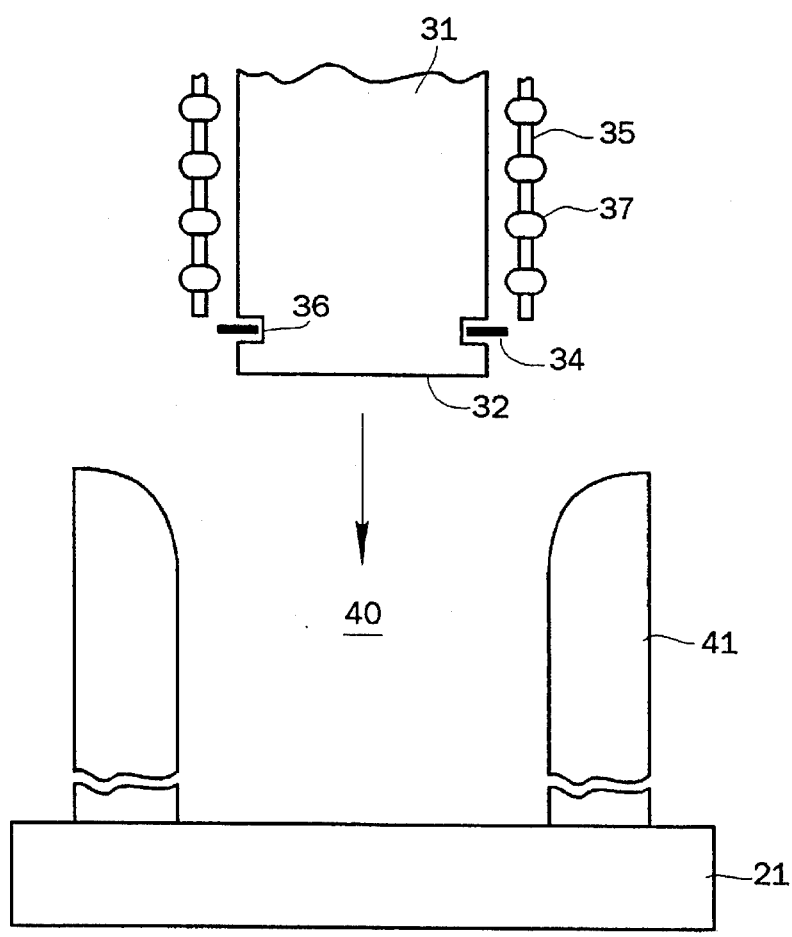
FIG. 3 is a detailed illustration of a conventional alignment bearing shaft and bushing arrangement of FIG. 2.
Figure 4:
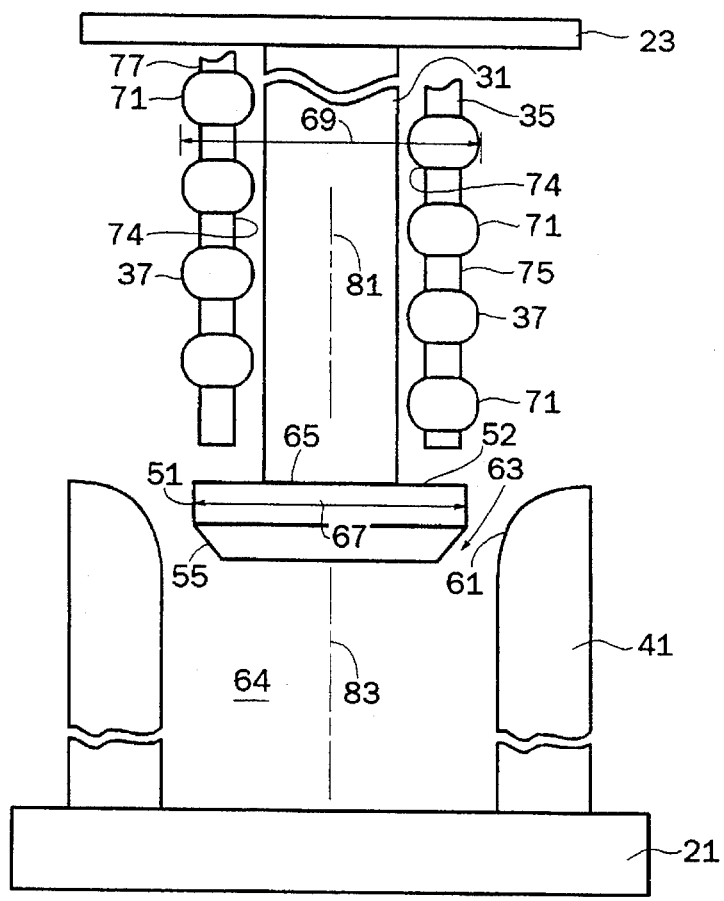
FIG. 4 diagrammatically illustrates an automatic die member alignment arrangement in accordance with the present invention having an alignment element affixed to a lower terminal end of a respective die member alignment shaft.

This modification of a respective alignment shaft is diagrammatically illustrated in FIG. 4 as an alignment element 51, which is affixed to a lower terminal end 52 of a respective die member alignment shaft 31. The alignment element 51 is preferably configured as a pin or disc having a tapered lower surface portion 55 that is generally complementary to the tapered interior surface portion 61 of the upper interior entry end portion 63 of a bore 64 of a respective bushing 41. Alignment pin 51 has an upper, generally disc-shaped portion 65, the diameter 67 of which is proximate to (slightly less than) the effective ball bearing cage diameter 69 defined by the surfaces 71 of ball bearings 37 that are captured within respective bores 75 distributed along the outer surface 77 of the bearing-containing sleeve or cage 35. Because the diameter of the alignment pin 51 is wider than the diameter of the interior bore 74 of the ball-bearing cage or sleeve 35, it also serves as a sleeve stop at the terminal end 52 of the alignment shaft 31.

As can be seen from FIG. 4, when the upper die member 23 is lowered toward the lower die member 21, the tapered alignment pin 51 is caused to contact the tapered interior surface portion 61 of the upper interior portion 63 of the bore 64 of bushing 41. To the extent that there is any misalignment of the axis 81 of alignment shaft 31 with the axis of bushing 41, contact between the tapered surface 55 of the alignment pin 51 and the tapered upper interior end wall portion 63 of bushing 41 causes a horizontal translational force to be imparted against the alignment shaft 31, so as to align the axis 81 of alignment shaft 31 with the axis 83 of bushing 41. Once so aligned with bushing 41, alignment shaft 31 on the upper die member easily passes into bushing 41 on the lower die member, allowing the ball bearing cage 35 to smoothly enter into the bore 64 of the bushing 41 on the lower die member 21, and maintain precise alignment between the die members as they are brought together by an associated actuator.

Figure 5:
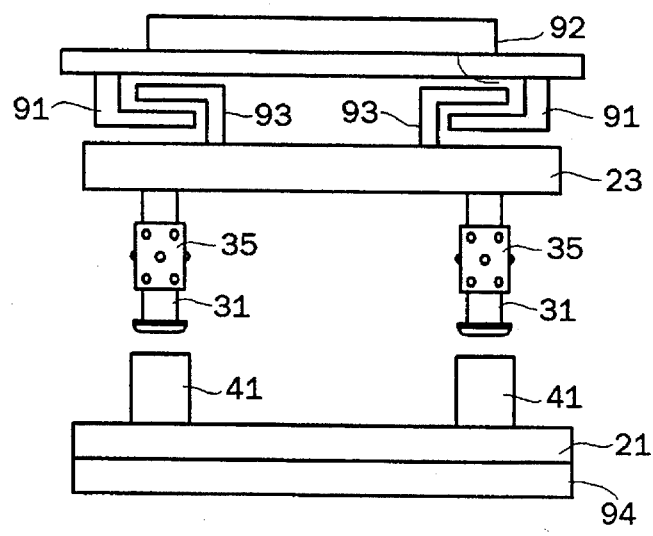
FIG. 5 diagrammatically illustrates the installation of a first set of rails at a part-excision, lead-forming station of a TAB apparatus, and a second set of rails on an upper die member.

FIG. 5 diagrammatically illustrates the installation of a first set of rails 91 at the part-excision, lead-forming station 12, beneath a die member actuator 92, and a second set of rails 93 on upper die member 23. The second set of rails 93 is sized to be supported by and slide upon the first set of rails 91, so as to allow upper die member 23 to be coarsely located upon the first set of rails 91, so that the upper die member 23 effectively mechanically floats on the first set of rails in the vicinity of its intended location where it is to engage the lower die member 21.

When the lower die member 21 is placed upon and fixedly attached to a translatable platen diagrammatically illustrated at 94, the platen is translated to an end stop position at the part excision station, so that platen abuts against the end stop. In this position, the actuator 92 is driven so as to downwardly translate the 'floating' upper die member 23 toward the lower die member 21. As the descending upper die member 23 approaches the lower die member, the tapered alignment pins 51 at the lower terminal ends of the alignment bearing shafts 31 come into contact with the bores in the bushings 41 on the lower die member 21.

As explained above, any axial misalignment between the alignment shafts 31 on the upper die member 23 and the bushings 41 on the lower die member 21 is removed as the tapered surfaces of the bores 64 of the bushings 41 impart a horizontal translational force against the alignment pins 51 and thereby against the alignment shafts 31 on the 'floating' upper die member 23. This horizontal force translates the upper die member 23 along the support surfaces of the rails 91, so as to bring the upper die member 23 into alignment with the lower die member 21, whereby the alignment shafts 31 on the upper die member 23 become effectively coaxial with the bushings 41 on the lower die member. Continued downward vertical movement of the upper die member 23 by the actuator 92 causes the ball bearing cages 35 on the alignment shafts to easily enter into the bores 64 of the bushings 41 on the lower die member 21.

As will be appreciated from the foregoing description, the above described drawbacks of hand alignment and installation of conventional die members of a TAB apparatus are effectively obviated by the die alignment bearing shaft arrangement of the present invention, which employs alignment pins and a set of support rails that operate to automatically align the upper and lower part excision die members at the time of installation, so that both initial installation and changeover of the die may be rapidly accomplished.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a part-forming apparatus having a part-forming station to which a part to be excised from a part carrier is transported, and a part excising device located at said part forming station and being operative to excise said part from said part carrier, said part forming station comprising a first die member and a second die member, which is to be mutually aligned with and brought into engagement with said first die member in order to excise said part from said part carrier, an arrangement for causing said first die member to undergo self-aligned engagement with said second die member, said arrangement comprising a plurality of alignment bearing shafts mounted on said first die member and having a plurality of bearing-containing sleeves slidably translatable along said alignment bearing shafts, and a plurality of bushings that are mounted on said second die member and are sized to receive respective ones of said plurality of bearing-containing sleeves of said alignment bearing shafts of said first die member, and thereby mutually align said first and second die members, so that said part may be excised thereby, a respective alignment bearing shaft of said first die member having an alignment element located at a terminal end thereof, said alignment element being tapered and sized to guide said respective alignment bearing shaft into said respective bushing, and wherein said first die member is supported at said part-forming station relative to said second die member so as to effectively mechanically float relative to said second die member, and thereby permit said first die member to be translated transverse to axes of said plurality of bushings mounted on said second die member, and facilitate entry of respective alignment elements into respective bushings.

2. An arrangement according to claim 1, wherein a respective bearing-containing sleeve contains a plurality of ball bearings supported along its outer surface, and wherein said alignment element has a diameter proximate to that defined by surfaces of said ball bearings contained along said outer surface of said bearing-containing sleeve.

3. An arrangement according to claim 2, wherein an end portion of a respective bushing has a tapered interior surface that is generally complementary to the tapered shape of a respective alignment element.

4. An arrangement according to claim 2, wherein said first die member is supported relative to said second die member by means of a first set of rails located at said part-forming station, and a second set of rails affixed to said first die member and being sized to slide upon said first set of rails, so as to allow said first die member to effectively mechanically float on said first set of rails relative to said second die member, and thereby permit said first die member to be translated transverse to axes of said plurality of bushings mounted on said second die member, and facilitate entry of said respective alignment elements into said respective bushings.

5. A die member alignment arrangement for automatically mutually aligning upper and lower part excision die members of a tape automated bonding apparatus, comprising a plurality of bushings affixed to said lower die member, and a plurality of alignment bearing-support shafts affixed to said upper die member, said upper die member being supported at a part-excision station of said tape automate bonding apparatus relative to said lower die member, so as to allow said upper die member to effectively mechanically float relative to said lower die member, and thereby permit said upper die member to be translated transverse to axes of said plurality of bushings affixed to said lower die member, and facilitate entry of said alignment elements into respective ones of said bushings, each alignment bearing-support shaft having a ball bearing cage slidable therealong, and an alignment element attached to a lower terminal end of thereof, said alignment element having a tapered lower surface that is generally complementary to a tapered interior surface of a respective bushing, and a diameter proximate to that defined by surfaces of ball bearings contained along an outer surface of said bearing-containing sleeve, so that said tapered lower surface of said alignment element readily guides its associated alignment bearing shaft and ball bearing sleeve into an associated bushing on said lower die member.

6. A die member alignment arrangement according to claim 5, wherein a respective bearing-containing sleeve contains a plurality of ball bearings supported along its outer surface, and wherein said alignment element has a diameter proximate to that defined by surfaces of said ball bearings contained along said outer surface of said bearing-containing sleeve.

7. An arrangement according to claim 6, wherein said upper die member is supported relative to said lower die member by means of a first set of rails located at said part-excision station, said upper die member having a second set of rails which are sized to slide upon said first set of rails, so as to allow said upper die member to effectively mechanically float on said first set of rails relative to said lower die member, and thereby permit said upper die member to be translated transverse to axes of said plurality of bushings affixed to said lower die member, and facilitate entry of said alignment elements into respective ones of said bushings.

* * * * *